United States Patent Office 3,197,487
Patented July 27, 1965

3,197,487
SALTS OF 2-METHYL-5-DIMETHYLAMINOMETH-YL-3-CARBOXYLIC ACID AND ITS ESTERS
Rolf Denss and Franz Hüfliger, Basel, Switzerland, assignors to Geigy Chemical Corporation, Ardsley, N.Y., a corporation of Delaware
No Drawing. Filed July 27, 1962, Ser. No. 213,043
Claims priority, application Switzerland, July 28, 1961, 8,912/61
6 Claims. (Cl. 269—347.2)

The present invention concerns new furan derivatives with valuable pharmacological properties as well as a process for the production of the same.

It has surprisingly been found that the salts of the cation of 2-methyl-5-trimethylammoniomethyl furan-3-carboxylic acid and its lower alkyl esters of the formula

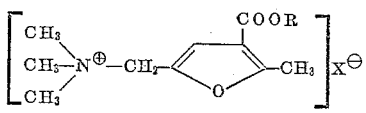

wherein

R is hydrogen or lower alkyl having from 1 to 4 carbon atoms, and $X^\ominus$ is the normal equivalent of a pharmaceutically acceptable acid ion, i.e., an anion of a monovalent inorganic or organic acid such as, for instance, $Cl^\ominus$, $Br^\ominus$, $I^\ominus$, benzoate, acetate, propionate, salicylate, lactate, methyl sulphate etc., a monovalent anion of a polyvalent inorganic or organic acid, such as, for instance, $HSO_4^\ominus$, $HOOCCOO^\ominus$, etc., or the normal anionic equivalent of an inorganic or organic acid, such as, for instance, the sulfate, fumarate, maleate, citrate or oxalate ion, as well as the betaine of the acid mentioned, which betaine has the formula

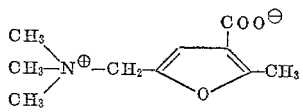

strongly stimulate contractions of the bladder and intestines, whilst the often undesirable effects on the parasympathetic nervous system, which have been observed with known contractant, such as acetylcholine, are considerably decreased.

The effects mentioned above are specific for the quaternary ammonium compounds according to the invention; the unquaternized dimethylaminomethyl compounds do not show these selective effects.

To produce the furan derivatives above mentioned, the 2-methyl-5-dimethylaminomethyl furan-3-carboxylic acid or a lower alkyl ester thereof is reacted with a reactive ester of methanol, and if desired, the anion formed by the reactive ester is replaced, in the resulting salt of the cation of 2-methyl-5-trimethylammoniomethyl furan-3-carboxylic acid or a lower alkyl ester thereof, by another mono- or poly-valent anion; if desired, the aforesaid lower alkyl ester, is hydrolized to the free acid or, if desired, a salt of the cation of the free acid is converted by elimination of the anion into the corresponding betaine.

The method above defined is performed, for example, by reacting in the presence or absence of a suitable organic solvent or diluent, a methyl halide, such as methyl iodide, methyl bromide or methyl chloride, an aryl sulfonic acid methyl ester such as p-toluene sulfonic acid methyl ester, or dimethyl sulfate, with 2-methyl-5-dimethylamino-methyl furan-3-carboxylic acid or its methyl, ethyl, n-propyl, isopropyl, n-butyl or isobutyl ester. Oxygen containing compounds, such as acetone, butanone, diethyl ether, dibutyl ether, tetrahydrofuran, dioxan, ethanol, methanol and ethyl acetate are suitable as organic solvents. The reaction is either performed with cooling, at room temperature or with slight heating, depending on the reactivity of the methanol ester used, but sufficient to complete the reaction.

In order to replace an anion which has been supplied by the reactive ester, in particular a halogen ion, by another anion, a salt obtained according to the invention is treated, e.g. with a suitably loaded anionic ion exchanger, such as Amberlite, which replaces the initial anion of the salt by another one, or a quaternary 2-methyl-5-trimethylammoniomethyl furan-3-carboxylic acid halide obtained according to the invention is reacted with the silver salt of the acid, whose anion is to form the new salt component.

The betaine can be formed by elimination of the anion in an analogous manner by treating the aforesaid halide with moist silver oxide or, preferably, by treatment with the $OH^-$ form of a suitable anionic ion exchanger such as Amberlite.

In a preferred mode of carrying out this treatment with an ion exchanger, the same is effected with simultaneous alkaline hydrolysis of the ester group, whereby the aforesaid salt of a lower alkyl ester of 2-methyl-5-trimethyl-ammoniomethyl furan-3-carboxylic acid is converted in a single step to the betaine of the said carboxylic acid.

The 2-methyl - 5 - dimethylaminomethyl furan - 3 - carboxylic acid and its lower alkyl esters are obtained, for example, by reacting lower alkyl esters of 2-methyl-5-formyl furan-3-carboxylic acid with dimethyl formamide in formic acid according to Leuckart [see Organic Reactions, vol. 5, pages 301–330 (1949)], and, if desired, subseqently hydroylzing to the free acid, or converting the most easily accessible ethyl ester via the free acid into another lower alkyl ester by treatment with the corresponding lower alkanol.

The following non-limiting examples illustrate the method for the preparation of the compounds according to the invention. Parts are given below as parts by weight and their relationship to parts by volume is as that of grams (g.) to cubic centimeters (cc.). The temperatures are in degrees centigrade.

*Example 1*

(a) 49.4 g. of 2-methyl-5-formyl furan-3-carboxylic acid ethyl ester is dissolved in 44.5 g. of formic acid 85% by slight warming and the solution obtained is added dropwise within 60 minutes to a mixture, heated to 155°, of 47.5 g. of pure dimethyl formamide and 14.5 g. of formic acid 85%. On completion of the addition, the reaction mixture is kept for 5 hours at 170°. It is then allowed to cool and the same volume of water is added. On repeated extraction with benzene, neutral products are removed. The aqueous phase is cooled with ice and, after covering with ether, it is made strongly alkaline. It is then extracted twice more with ether using fresh solvent. The combined extracts are dried over magnesium sulfate and, after filtration, the 2 - methyl - 5 - dimethyl-aminomethyl furan-3-carboxylic acid ethyl ester is isolated by distillation. The compound boils at 122–123°/10 mm. Hg. It is colorless but in the air it quickly turns yellow.

(b) 21.1 parts of 2 - methyl - 5 - dimethylaminomethyl furan-3-carboxylic acid ethyl ester are dissolved in 400 parts by volume of acetone and 15 parts of methyl iodide dissolved in 30 parts by volume of acetone are added to the solution while stirring and cooling externally. The iodide of 2-methyl-5-trimethylammoniomethyl furan-3-carboxylic acid ethyl ester which immediately crystallizes is left to stand for 1 hour and is then filtered off under suction at 0° and washed with acetone. After recrystallizing from ethanol, the compound melts at 192–194°.

The methyl sulfate of 2-methyl-5-trimethylammoniomethyl furan-3-carboxylic acid ethyl ester is obtained in an analogous manner from 21.1 parts of 2-methyl-5-dimethylaminomethyl furan-3-carboxylic acid ethyl ester and 13.8 parts of dimethyl sulfate. After recrystallization from acetone, the compound melts at 150–151°.

(c) To produce the chloride of 2-methyl-5-trimethylammoniomethyl furan-3-carboxylic acid ethyl ester, 10.6 parts of the quaternary iodide described above are vigorously stirred for 3 hours with a suspension of silver chloride (freshly prepared from 20.7 parts of silver nitrate and 11.4 parts of sodium chloride) in 250 parts by volume of anhydrous ethanol. After filtering and evaporating off the solvent, the quaternary chloride which remains is recrystallized from methanol/ether. M.P. 165–166° (the compound crystallizes with 1 mol of crystal water).

(d) To produce compounds according to the invention which contain other anions, e.g., the acetate of 2-methyl-5-trimethylammoniomethyl furan-3-carboxylic acid ethyl ester, the chloride obtained in Example 1 (c) dissolved in water is slowly trickled through a column of Amberlite IRA 400 ($CH_3COO^-$ form). The column is washed through with water until no more substance is eluted. From the combined eluates, the acetate of 2-methyl-5-trimethylammoniomethyl furan-3-carboxylic acid ethyl ester is obtained in the manner described above under (c).

In an analogous manner, the propionate, lactate, fumarate, maleate and citrate of the above-mentioned compound are obtained.

Example 2

(a) 21.1 parts of 2-methyl-5-trimethylaminomethyl furan-3-carboxylic acid ethyl ester are heated for 3 hours while stirring at 50 to 60° with a solution of 63 parts of baryta ($Ba(OH)_2 \cdot 8H_2O$) in 600 parts by volume of water. The exactly calculated amount of dilute sulfuric acid is then added to the solution, precipitated barium sulfate is filtered off and the filtrate is concentrated in vacuo at 40 to 50°. The 2-methyl-5-dimethylaminomethyl furan-3-carboxylic acid which remains can be recrystallized from water/acetone: M.P. 159–161°. The compound crystallizes with one mol of crystal water which can be removed, for example, by drying for 8 hours at 70 to 80° and $10^{-4}$ mm. Hg pressure.

(b) 9.15 parts of 2-methyl-5-dimethylaminomethyl furan-3-carboxylic acid (free of crystal water) are suspended in a solution of 3.95 parts of pyridine and 100 parts by volume of methylene chloride and 5.95 parts of thionyl chloride in 20 parts by volume of methylene chloride are added to the suspension at 0° to 5° while stirring. The reaction mixture is stirred for 3 hours in an ice bath and then 3.2 parts of methanol in 10 parts by volume of methylene chloride are added dropwise at 0° to 5°. The reaction mixture is then stirred for 30 minutes at room temperature and afterwards refluxed for 15 hours. The solvent is then distilled off in vacuo, the residue is washed in water, made alkaline while cooling with ice and thoroughly extracted with ether. After drying the ether solution with sodium sulfate and distilling off the ether the residue is distilled under high vacuum. The 2-methyl-5-dimethylaminomethyl furan-3-carboxylic acid methyl ester obtained boils at 77–78° under $10^{-3}$ mm. Hg pressure.

(c) 19.7 parts of 2-methyl-5-dimethylaminomethyl furan-3-carboxylic acid methyl ester are dissolved in 200 parts by volume of acetone and 15 parts of methyl iodide dissolved in 30 parts by volume of acetone are added while externally cooling. After standing for several hours at 0° the iodide, in crystalline form, of 2-methyl-5-trimethylammoniomethyl furan-3-carboxylic acid methyl ester is filtered off under suction, washed with acetone and recrystallized from methanol/ether. M.P. 188–190° under decomposition.

Also the iodide of 2-methyl-5-trimethylammoniomethyl furan-3-carboxylic acid isopropyl ester can be produced by the process described above. Recrystallized from methanol/ether, it melts at 168–1690°.

Example 3

18.3 parts of the 2-methyl-5-dimethylaminomethyl furan-3-carboxylic acid (anhydrous) are dissolved in 150 parts by volume of ethanol and 15 parts of methyl iodide in 30 parts by volume of ethanol are added to the solution. 450 parts by volume of ether are then added in portions whereupon the iodide of 2-methyl-5-trimethylammoniomethyl furan-3-carboxylic acid crystallizes out. It can be recrystallized from ethanol/ether. M.P. 174–175° (under decomposition).

Example 4

35.3 parts of the iodide of 2-methyl-5-trimethylammonio-methyl furan-3-carboxylic acid ethyl ester described in Example 1 are dissolved in 350 parts of water and the solution is slowly trickled through a column of 500 parts by volume of Amberlite IRA 400 ($OH^-$ form). The column is then washed through with water until no more substance is eluted. The combined aqueous eluates are concentrated in a water jet vacuum at a bath temperature of 50–60°. The betaine of 2-methyl-5-trimethylammoniomethyl furan-3-carboxylic acid which remains, after recrystallization from methanol/ether, melts at 218–220° under decomposition.

The same betaine is obtained if the iodide of 2-methyl-5-trimethylammoniomethyl furan-3-carboxylic acid described in Example 3 is treated in an analogous manner with Amberlite IRA 400 ($OH^-$ form).

What is claimed is:

1. A compound of the formula

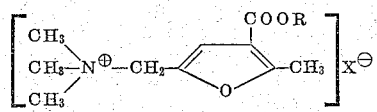

wherein
R is a member selected from the group consisting of hydrogen and lower alkyl, and
$X^\ominus$ is the normal equivalent of a pharmaceutically acceptable acid ion.

2. The betaine of the formula

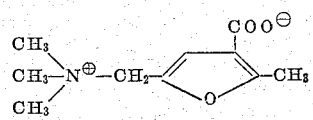

3. 2-methyl-5-trimethylammoniomethyl-furan-3-carbonic acid ethyl ester methyl sulfate.

4. 2-methyl-5-trimethylammoniomethyl-furan-3-carbonic acid ethyl ester iodide.

5. 2-methyl-5-trimethylammoniomethyl-furan-3-carbonic acid methyl ester iodide.

6. 2-methyl-5-trimethylammoniomethyl-furan-3-carbonic acid isopropyl ester iodide.

No references cited.

NICHOLAS S. RIZZO, *Primary Examiner.*

JOHN D. RANDOLPH, WALTER A. MODANCE, *Examiners.*